//  
United States Patent Office 3,113,130  
Patented Dec. 3, 1963

3,113,130  
12-AMINOSTEROIDS AND PRODUCTION THEREOF  
Hiroshi Mitsuhashi, Sapporo, Japan, assignor to Shionogi & Co., Ltd., Osaka, Japan  
No Drawing. Filed May 21, 1962, Ser. No. 196,472  
Claims priority, application Japan June 10, 1961  
12 Claims. (Cl. 260—239.55)

The present invention relates to 12-aminosteroids and is more particularly concerned with 12-aminopregnanes, intermediates in the production thereof, and process for their production.

The new 12-aminopregnanes and process of this invention are illustratively represented by the following formulae:

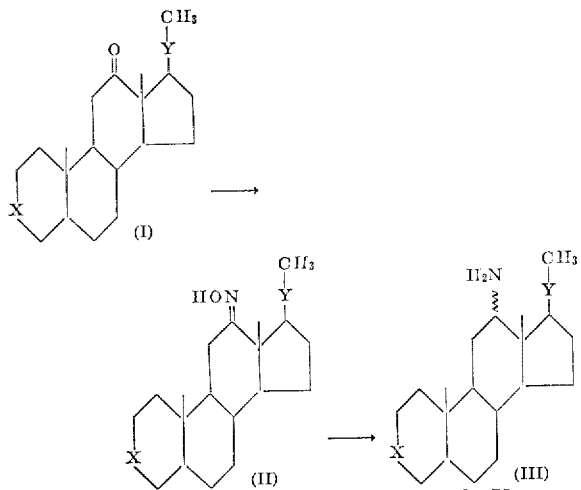

wherein X represents >CH(OH) or >C=O; Y represents >CH$_2$, >CH(OH) or >C=O; a double bond can exist between 4- and 5-positions; the hydrogen atom at 5-position, when the said double bond does not exist, has α- or β-configuration; and the ripple mark ($ $) is a generic indication of both α- and β-configurations. In this connection, it should be understood that the foregoing formulae show the substantial order of the steps in the production, modifications and equivalents—including possible detours—being omitted. Thus, any hydroxyl and/or oxo radicals, except the oxo radical and the hydroxyl radical of the hydroxyimino radical at 12-position, in the disclosed compounds are intended also to represent such radicals properly protected. In other words, the showing of an hydroxyl radical is intended to represent a free hydroxyl or a protected hydroxyl such as acylated hydroxyl, and the showing of an oxo radical is intended to represent a free oxo or a protected oxo such as ketalized oxo. Still more it should be also understood that the double bond between 4- and 5-positions, if present, may be removed to between 5- and 6-positions, when the oxo radical at 3-position is protected.

The starting materials of the present inveniton are 12-oxopregnanes, corresponding to Formula I, and may be fundamentally exemplified as follows: 5α-pregnane-3β-ol-12-one, 5α-pregnane-3β,20β-diol-12-one, 5α-pregnane-3α,20β-diol-12-one, 5α-pregnane-3β-ol-12,20-dione, 5β-pregnane-3β-ol-12-one, 5β-pregnane-3β,20β-diol-12-one, 5β-pregnane-3α,20β-diol-12-one, 5β-pregnane-3β-ol-12,20-dione, 5β-pregnane-3,12,20-trione, 4-pregnene-20β-ol-3,12-dione, 4-pregnene-20α-ol-3,12-dione, 4-pregnene-3,12,20-trione, etc. Each of said 12-oxopregnanes is known or can be easily prepared from known steroids according to conventional manners. Although said 12-oxo-pregnanes can be equally used as the starting material of the present invention, the oxo radicals at 3- and/or 20-positions are in general undesirably affected or block the selective conversion of the oxo radical at 12-position into the hydroxyimino radical and/or the amino radical. In such case, the previous protection of the oxo radicals at 3- and/or 20-positions as the ketalized oxo radicals is requisite. On the other hand, the protection of the hydroxyl radical is unnecessary, because those are ordinarily not affected by the reactions in the process of the present invention. However, 12-oxopregnanes in which the hydroxyl radicals at 3- and/or 20-positions are acylated may be sometimes preferably employed for some reason (e.g. easy availability, higher yield of product, convenience in purification). In this sense, the following specific 12-oxopregnanes may be also exemplified as the starting material: 5α-pregnane-3β-ol-12-one 3-acetate, 5α-pregnane-3β,20β-diol-12-one 3-acetate, 5α-pregnane-3β,20β-diol-12-one 3,20-diacetate, 5α-pregnane-3α,20β-diol-12-one 3,20-diacetate, 5β-pregnane-3β,20β-diol-12-one 3,20-dipropionate, 5β-pregnane-3β-ol-12,20-dione 3-butyrate, 3,3,20,20-bisethylenedioxy-5-pregnene-12-one, 3,3,20,20-bisethylenedioxy-5β-pregnane-12-one, 3,3,20,20-bisethylenedioxy-5α-pregnane-12-one, etc. Thus, the starting 12-oxopregnanes preferably employed may be represented by the following formula:

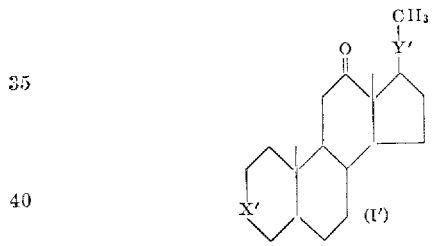

wherein X' is a member selected from the group consisting of α-hydroxymethylene, β-hydroxymethylene, α-lower alkanoyloxymethylene (e.g. α-acetoxymethylene, α-propionyloxymethylene), β-lower alkanoyloxymethylene (e.g. β-acetoxymethylene, β-propionyloxymethylene, β-butyryloxymethylene), carbonyl and lower alkylenedioxymethylene (e.g. ethylenedioxymethylene); Y' is a member selected from the group consisting of methylene, α-hydroxymethylene, β-hydroxymethylene, α-lower alkanoyloxymethylene (e.g. α-acetoxy-methylene, α-propionyloxymethylene), β-lower alkanoyloxymethylene (e.g. β-acetoxymethylene, β-propionyloxymethylene, β-butyryloxymethylene), carbonyl and lower alkylenedioxymethylene (e.g. ethylenedioxymethylene); a double bond can exist between 4- and 5-positions or 5- and 6-positions; and the hydrogen atom at 5-position, when the said double bond does not exist, has α- or β-configuration.

The process of the present invention substantially comprises two steps, i.e. the oximation (oxime-formation) and the reductive amination. When the 12-oxopregnanes (I) wherein the hydroxyl and/or oxo radicals at 3- and/or 20-positions are protected are used as the starting material, the elimination of the protecting group may be executed at a proper stage, i.e. subsequent to the oximation or the reductive amination, according to conventional manners. For instance, deacylation can be easily carried out by treatment of the acyloxy compound with alkali, usually while heating, and deketalation by heating the ketalized compound with acid. Sometimes, the elimination advantageously may take place with the proceeding of the reaction in the oximation step or the reductive amination step.

The oximation may be carried out by treating substantially the 12-oxopregnanes (I) with hydroxylamine. For instance, the reaction may be performed by heating the 12-oxopregnanes (I) with hydroxylamine, prepared from its mineral acid salts (e.g. hydroxylamine hydrochloride, hydroxylamine sulfate) and basic substances (e.g. sodium acetate, sodium hydroxide), under reflux, conveniently in the presence of an inert solvent (e.g. methanol, ethanol). Alternatively, the reaction may be also performed by heating the 12-oxo-pregnanes (I) with hydroxylamine mineral acid salts (e.g. hydroxylamine hydrochloride, hydroxylamine sulfate) in basic solvents (e.g. pyridine, collidine, N,N-dimethylaniline) under reflux. Under these conditions, the reaction time is usually from 30 minutes to 4 hours. Both higher and lower temperature than the reflux temperature of the reaction mixture and shorter and longer reaction times than the said time are operative, the lower temperature usually requiring a correspondingly longer reaction time.

The thus-prepared 12-hydroxyiminopregnanes (II) can be isolated from the reaction mixture by conventional methods, for instance, when a water-miscible solvent is used, by pouring the reaction mixture into water and separating the resultant precipitate by filtration. Additional purification of the product can be accomplished by conventional methods, for instance, by recrystallization from a suitable organic solvent.

The reductive amination may be carried out by a variety of conventional reduction procedures (e.g. the use of alkaline metals and lower alkanols, the use of reducing agents, the catalytic reduction). For instance, the reaction can be performed by heating the 12-hydroxyiminopregnanes (II) with metallic sodium in anhydrous lower alkanols (e.g. ethanol, propanol, butanol) while refluxing. In this case, the use of large excess (three to ten times of the theoretical amount) of metallic sodium and the prompt accomplishment of reaction are preferred. Alternatively, the reaction may be carried out by treating the 12-hydroxyiminopregnanes (II) with lithium aluminum hydride in a suitable organic solvent (e.g. ether, tetrahydrofuran) while refluxing. The reaction may be also executed catalytically, for instance, by subjecting the 12-hydroxyiminopregnanes (II) to hydrogenation in the presence of platinum oxide in an inert organic solvent. The concrete reaction conditions (e.g. the reaction time, the reaction temperature, the molar ratio of the reagents) of said reduction procedures may be obvious to those skilled in the art.

The recovery of the thus-prepared 12-aminopregnanes (III) from the reaction mixture can be performed by the conventional manner corresponding to the employed reduction procedure.

As the result of the reductive amination, there is obtained a mixture of 12α-aminopregnanes and 12β-aminopregnanes, each being represented by the following formulae:

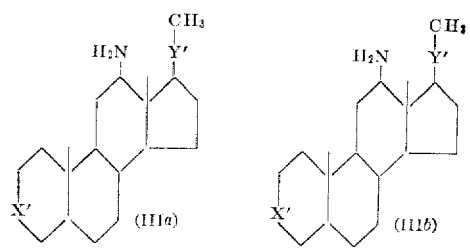

wherein X' and Y' each have the same significance as designated above; a double bond can exist between 4- and 5-positions or 5- and 6-positions; and the hydrogen atom at 5-position, when the said double bond does not exist, has α- or β-configuration. It is associated with the reduction procedure employed whether the 12α-aminopregnanes (IIIa) or the 12β-aminopregnanes (IIIb) are obtained as a main product. For instance, there are obtained as a main product the 12α-aminopregnanes (IIIa), when lithium aluminum hydride is employed for the reduction, and the 12β-aminopregnanes (IIIb), when the combination of metallic sodium with lower alkanols is employed. For the separation of each isomer, there may be adopted conventional manners (e.g. chromatography, recrystallization). The separation may be also made after their conversion into suitable acid salts. For instance, the isomeric mixture may be treated with tartaric acid and the resulting tartrates subjected to separation by recrystallization procedure, followed by the elimination of the tartaric acid by treatment of each separated tartrate with an alkali (e.g. sodium hydroxide, postassium hydroxide).

The final product, 12-aminopregnane, corresponds to the following formula:

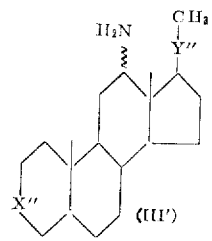

wherein X" is a member selected from the group consisting of α-hydroxymethylene, β-hydroxymethylene and carbonyl; Y" is a member selected from the group consisting of methylene, α-hydroxymethylene, β-hydroxymethylene and carbonyl; a double bond can exist between 4- and 5-positions; the hydrogen atom at 5-position, when the said double bond does not exist, has α- or β-configuration; and the ripple mark ($) is a generic indication of both α- and β-configurations.

The 12-aminopregnanes (III') show physiological activities (e.g. Na-retaining activity, anti-deciduomatogenic activity), regardless of the configuration of the amino radical at 12-position. Especially, it may be noted that those compounds possess marked anti-progestational activities as a characteristic. For instance, the intrauterine injection of those compounds (e.g. 12β-amino-5α-pregnane-3β,20β-diol, 12α-amino-5α-pregnane-3β,20β-diol, 12β-amino-5α-pregnane-3β-ol) at dose of 2.5 milligrams produced complete block of progestational response induced by 4 milligrams of progesterone in the Clauberg rabbit (the estrogen-primed immature rabbit). Thus, each isomer of 12-aminopregnanes (III'), isomeric mixtures thereof and non-toxic salts thereof (e.g. the hydrochloride) may be useful as anti-fertility agents.

The following examples set forth illustratively presently-preferred embodiments of the invention.

In the examples which follow, the abbreviations have the following significances: mg., milligram(s); g., gram(s); ml., millilitre(s); Anal. Calcd., analysis calculated and ° C., degrees centigrade. Other abbreviations have conventional significances.

EXAMPLE 1

*Preparation of 12β-Amino-5α-Pregnane-3β,20β-Diol*

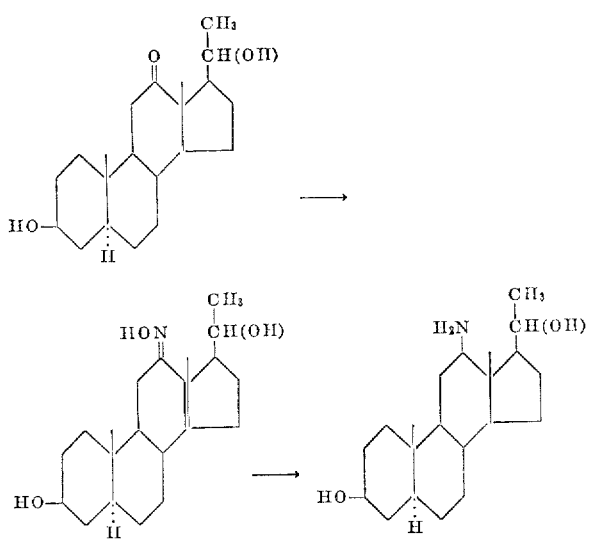

(a) 12-hydroxyimino-5α-pregnane-3β,20β-diol: To a solution of 5α-pregnane-3β,20β-diol-12-one (1.5 g.) in ethanol (20 ml.), there are added hydroxylamine hydrochloride (1.5 g.), sodium acetate (3 g.) and water (8 ml.), and the resultant mixture is refluxed for 2 hours on a steam bath. To the reaction mixture, there is added water. After cooling, the precipitated crystals are collected by filtration, washed with water and recrystallized from aqueous ethanol to afford 12-hydroxyimino-5α-pregnane-3β,20β-diol as needles melting at 250° C. (decomp.) in an approximately theoretical yield.

(b) 12β-amino-5α-pregnane-3β,20β-diol: To a solution of 12-hydroxyimino-5α-pregnane-3β,20β-diol (1.3 g.) in anhydrous n-propanol (100 ml.), there is added metallic sodium (8 g.) in 15 minutes while refluxing, and the resulting mixture is refluxed for 2 hours. After cooling, water is added to the reaction mixture nad neutralized with acetic acid. Evaporating the propanol under a reduced pressure, the resultant residue is treated with sodium hydroxide. The precipitate are collected by filtration to afford crude crystals of 12β-amino-5α-pregnane-3β,20β-diol in an approximately theoretical yield. For purification, the compound is changed to the hydrochloride (decomposing around 260° C.), which is again changed to the free amine and recrystallized from aqueous ethanol to afford pure needles melting at 209 to 211° C.

Anal. Calcd. for $C_{21}H_{37}O_2N$: C, 75.17; H, 11.12; N, 4.18. Found: C, 75.05; H, 11.23; N, 3.98

The starting material of this example, 5α-pregnane-3β,20β-diol-12-one, is a known steroid (Kirk et al.: J. Chem. Soc., page 1046 (1957)].

EXAMPLE 2

*Preparation of 12β-Amino-5α-Pregnane-3β,20β-Diol*

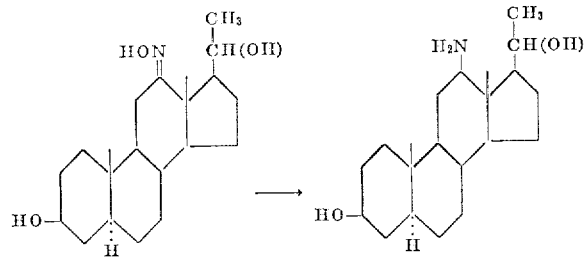

12-hydroxyimino-5α-pregnane-3β,20β-diol (250 mg.), prepared as in Example 1(a), is subjected to hydrogenation by shaking with platinum oxide (130 mg.) in a mixture of ethanol (20 ml.) and glacial acetic acid (5 ml.) for 8 hours. After absorption of hydrogen is accomplished, the catalyst is filtered off. The filtrate is made alkaline with sodium hydroxide and the precipitated white needles are collected by filtration. The needles (150 mg.) are recrystallized from aqueous methanol to afford 12β-amino-5α-pregnane-3β,20β-diol as pillars melting at 206 to 209° C.

EXAMPLE 3

*Preparation of 12α-Amino-5α-Pregnane-3β,20β-Diol and 12β-Amino-5α-Pregnane-3β,20β-Diol*

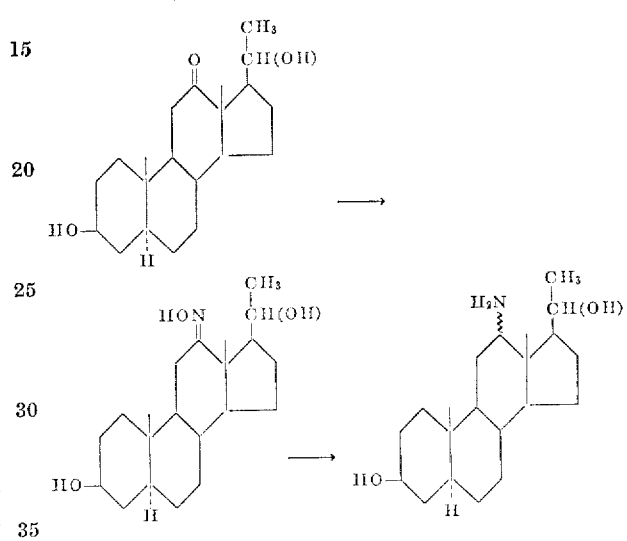

(a) 12-hydroxyimino-5α-pregnane-3β,20β-diol: A mixture of 5α-pregnane-3β,20β-diol-12-one (10 g.), hydroxylamine hydrochloride (10 g.), anhydrous sodium acetate (10 g.), ethanol (150 ml.) and water (50 ml.) is refluxed for 2 hours on a steam bath. After concentration of the reaction mixture under a reduced pressure, the resultant mass is added to water, and the white precipitates are collected by filtration. The precipitates (9.8 g.) are recrystallized from methanol to afford 12-hydroxyimino-5α-pregnane-3β,20β-diol as needles (9.0 g.) melting at 250 to 252° C. (decomp.)

IR $\nu_{max}^{Nujol}$ 3446, 3205, 3104, 1636, cm.$^{-1}$

Anal. Calcd. for $C_{21}H_{35}O_3N$: C, 72.16; H, 10.09; N, 4.01. Found: C, 72.30; H, 10.18; N, 3.96

(b) A mixture of 12α-amino-5α-pregnane-3β,20β-diol and 12β-amino-5α-pregnane-3β,20β-diol: To a solution of 12-hydroxyimino-5α-pregnane-3β,20β-diol (5.0 g.) in n-propanol (500 ml.), there is added metallic sodium (40 g.) in 30 minutes with stirring while refluxing, and stirring is continued for 3 hours. Cooling the reaction mixture, dilute acetic acid is added to make neutrality or weak acidity. Evaporating the propanol under a reduced pressure, the condensate is mixed with a large amount of water. Then, 10% sodium hydroxide solution is added to the resulting mixture under cooling with ice to make alkalinity. The mixture is extracted with chloroform and the extract is washed with water, dried and concentrated to afford crude crystals (4.5 g.) of the mixture of 12α-amino-5α-pragnane-3β,20β-diol and 12β-amino-5α-pregnane-3β,20β-diol.

(c) 12α-amino-5α-pregnane-3β,20β-diol and 12β-amino-5α-pregnane-3β,20β-diol: The mixture of 12α-amino-5α-pregnane-3β,20β-diol and 12β-amino-5α-pregnane-3β,20β-diol (4.5 g.) obtained above is dissolved in acetone (200 ml.) on heating and filtered to separate the insoluble substance. To the filtrate, there is added a solution of tartaric acid (2.5 g.) in acetone (100 ml.). The precipitated crystals are collected by filtration to obtain the mixture of 12α-amino-5α-pregnane-3β,20β-diol tartrate and 12β-amino-5α-pregnane-3β,20β-diol tartrate (6.0 g.) melting at 190 to 200° C. (decomp.).

Recrystallization of the mixture of the tartrates from methanol affords 12α-amino-5α-pregnane-3β,20β-diol tartrate (676 mg.) as crystals melting at 212 to 215° C. (decomp.).

Anal. Calcd. for $C_{25}H_{43}O_8N \cdot H_2O$: C, 59.26; H, 9.01; N, 2.78. Found: C, 59.37; H, 9.18; N, 2.70.

This substance is treated with sodium hydroxide solution to give the free base, which is recrystallized from aqueous methanol to afford 12α-amino-5α-pregnane-3β,20β-diol (534 mg.) as hygroscopic crystals melting at 198 to 200° C.

IR $\nu_{max.}^{Nujol}$ 3403, 3173, 1583, 1042 cm.$^{-1}$

Anal. Calcd. for $C_{21}H_{37}O_2N$: C, 75.17; H, 11.12; N, 4.18. Found: C, 75.20; H, 11.23; N, 3.98.

The mother liquor from the 12α-amino-5α-pregnane-3β,20β-diol tartrate is separated and concentrated to about ⅓ volume. To the concentrate, there is added acetone (150 ml.). The separated crystals are collected by filtration and recrystallized from methanol-acetone to afford 12β-amino-5α-pregnane-3β,20β-diol tartrate (3.85 g.) as crystals melting at 211 to 214° C.

Anal. Calcd. for $C_{25}H_{43}O_8N$: C, 61.83; H, 8.93; N, 2.88. Found: C, 62.03; H, 9.31; N, 2.54.

This substance is treated with sodium hydroxide solution to give the free base, which is recrystallized from aqueous methanol to afford 12β-amino-5α-pregnane-3β,20β-diol (3.10 g.) as crystals melting at 212 to 215° C.

IR $\nu_{max.}^{Nujol}$ 3333, 3273, 3203, 1600, 1049 cm.$^{-1}$

Anal. Calcd. for $C_{21}H_{37}O_2N$: C, 75.17; H, 11.12; N, 4.18. Found: C, 75.38; H, 11.28; N, 423.

EXAMPLE 4

*Preparation of 12α-Amino-5α-Pregnane-3β,20β-Diol and 12β-Amino-5α-Pregnane-3β,20β-Diol*

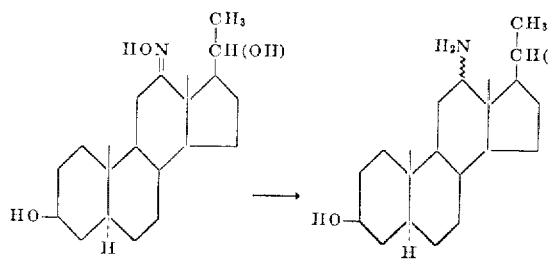

12-hydroxyimino-5α-pregnane-3β,20β-diol (1 g.), prepared as in Example 3(a), is refluxed for 66 hours with lithium aluminum hydride (2.0 g.) in tetrahydrofuran (50 ml.). After excess of the reduced agent is decomposed with water, the solvent is evaporated from the reaction mixture. Adding a large amount of water to the condensate, the mixture is extracted with chloroform. Removal of the solvent from the extract affords a mixture of 12α-amino-5α-pregnane-3β,20β-diol and 12β-amino-5α-pregnane-3β,20β-diol. This mixture is treated with tartaric acid in acetone to afford a mixture of 12α-amino-5α-pregnane-3β,20β-diol tartrate and 12β-amino-5α-pregnane-3β,20β-diol tartrate (873 mg.). The mixture of the tartrates is recrystallized from methanol to give 12α-amino-5α-pregnane-3β,20β-diol tartrate (450 mg.) as crystals melting at 212 to 215° C. (decomp.) and, from the resulting mother liquor, there is obtained 12β-amino-5α-pregnane-3β,20β-diol tartrate (275 mg.) as crystals melting at 211 to 214° C. (decomp.). Each of said tartrates affords the corresponding free 12-amino steroid by treatment with sodium hydroxide solution.

EXAMPLE 5

*Preparation of 12β-Amino-5α-Pregnane-3β-Ol*

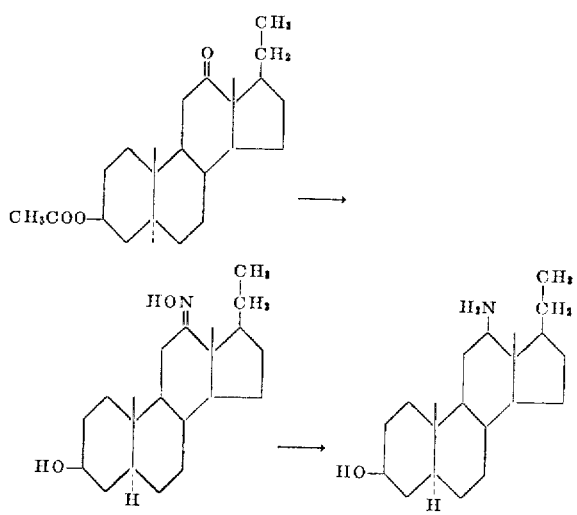

(a) 12-hydroxyimino-5α-pregnane-3β-ol: As in Example 3(a), 5α-pregnane-3β-ol-12-one 3-acetate (1.5 g.) is reacted with hydroxylamine to afford 12-hydroxyimino-5α-pregnane-3β-ol as prisms melting at 140° C. (recrystallized from methanol) in an approximately theoretical yield.

(b) 12β-amino-5α-pregnane-3β-ol: 12 - hydroxyimino-5α-pregnane-3β-ol (1.0 g.) prepared above is dissolved in anhydrous propanol (100 ml.). To the resulting solution, there is added metallic sodium (6 g.) in 15 minutes while refluxing. The resultant mixture is refluxed up to the complete dissolution of the metallic sodium. Then, the solvent is evaporated under a reduced pressure. To the condensate, there is added water whereupon crystals are precipitated. The crystals are collected by filtration, washed with water and recrystallized from methanol to afford 12β-amino-5α-pregnane-3β-ol as crystals melting at 137 to 138° C. Yield, 80 percent.

Anal. Calcd. for $C_{21}H_{37}ON$: C, 78.94; H, 11.67; N, 4.38. Found: C, 78.65; H, 12.00; N, 4.51.

The starting material of this example, 5α-pregnane-3β-ol-12-one 3-acetate, is a known steroid [Wall et al.: J. Org. Chem., vol. 26, page 159 (1961)].

EXAMPLE 6

*Preparation of 12α-Amino-4-Pregnene-3,20-Dione and 12β-Amino-4-Pregnene-3,20-Dione*

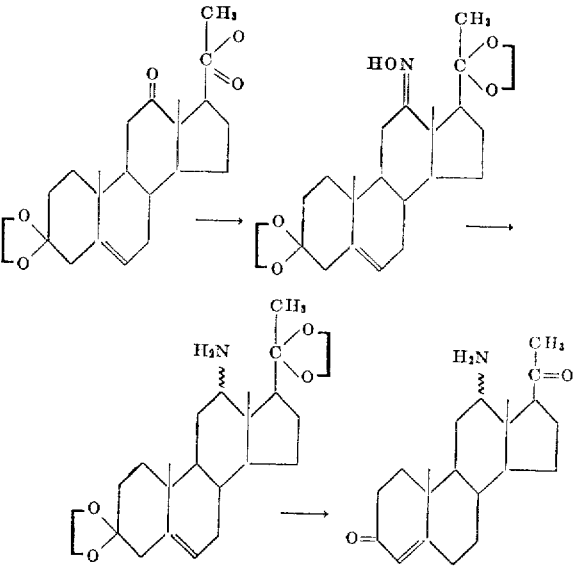

(a) 3,3,20,20 - bisethylenedioxy - 12 - hydroxyimino-5-pregnene: To a solution of 3,3,20,20-bisethylenedioxy-5-pregnene-12-one (5 g.) in ethanol (60 ml.), there is added hydroxylamine prepared by allowing hydroxylamine hydrochloride (5 g.) to stand with sodium acetate (10 g.) and water (10 ml.) for 1 hour, and the resulting mixture is heated for 30 minutes on a steam bath. The precipitated sodium chloride is filtered and washed with ethanol. The washing and the filtrate are combined together and the solvent is evaporated under a reduced pressure to afford a crystalline residue. The residue is recrystallized from acetone to give 3,3,20,20-bisethylenedioxy-12-hydroxyimino-5-pregnene (4.73 g.) as needles melting at 229 to 230° C. (decomp.).

IR $\nu_{max.}^{Nujol}$ 3435, 1653, 1105, 951, 929, 859, 830, 808 cm.$^{-1}$

Anal. Calcd. for $C_{25}H_{37}O_5N$: C, 69.57; H, 8.64; N, 3.25. Found: C, 69.34; H, 8.35; N, 3.05.

The above-prepared 3,3,20,20-bisethylenedioxy-12-hydroxyimino-5-pregnene (100 mg.) is suspended in 50% acetic acid (5 ml.), and the resultant suspension is heated for 30 minutes on a steam bath. After cooling, water is added to the reaction mixture, and extracted with chloroform. The extract is washed with water, sodium sulfate and water in order, dried and the solvent removed off to afford an oily residue (85 mg.). The residue is recrystallized from methanol to give 12-hydroxyimino-4-pregnene-3,20-dione (53 mg.) as cubic crystals melting at 215 to 216° C. (decomp.).

UV $\lambda_{max.}^{ethanol}$ 240 m$\mu$ ($\epsilon$: 20,500). IR $\nu_{max.}^{chloroform}$ 3527, 3305, 1705, 1670, 1635, 1105 cm.$^{-1}$ Anal. Calcd. for $C_{21}H_{29}O_3N.\frac{1}{2}CH_3OH$: C, 71.84; H, 8.70; N, 3.89. Found: C, 72.25; H, 8.83; N, 3.91.

(b) A mixture of 3,3,20,20 - bisethylenedioxy - 12α-amino-5-pregnene and 3,3,20,20 - bisethylenedioxy - 12β-amino-5-pregnene: To a solution of 3,3,20,20-bisethylenedioxy-12-hydroxyimino-5-pregnene (4.0 g.) in n-propanol (500 ml.), there is added metallic sodium (20 g.) portionwise in 30 minutes with stirring while refluxing, and the resultant mixture is refluxed for additional 2 hours. After cooling, water is added to the reaction mixture. On cooling, acetic acid (47 g.) is added to the resulting solution. The mixture is concentrated under a reduced pressure. Water is added to the residue and extracted with chloroform. The extract is washed with water, dried and the solvent evaporated to afford a crystalline residue, which is recrystallized from ether whereupon a mixture of 3,3,20,20-bisethylenedioxy-12α-amino-5-pregnene and 3,3,20,20-bisethylenedioxy-12β-amino-5-pregnene (2.50 g.) is obtained as prisms melting at 139 to 143° C.

(c) A mixture of 12α-amino-4-pregnene-3,20-dione and 12β-amino-4-pregnene-3,20-dione: To a solution of the mixture of 3,3,20,20 - bisethylenedioxy - 12α - amino-5-pregnene and 3,3,20,20-bisethylenedioxy - 12β - amino-5-pregnene (1.0 g.) in acetone (100 ml.), there is added a few drops of conc. hydrochloric acid, and the resulting solution is refluxed for 5 minutes on a steam bath. After cooling, the precipitated pillars are collected by filtration, washed with acetone, and recrystallized from methanol-acetone to afford a mixture of 12α-amino-4-pregnene-3,20-dione hydrochloride and 12β-amino - 4 - pregnene-3,20-dione hydrochloride (718 mg.) as pillars melting at 240 to 243° C. (decomp.).

UV $\lambda_{max.}^{ethanol}$ 240 m$\mu$ ($\epsilon$: 18,900)

Anal. Calcd. for $C_{21}H_{31}O_2N.HCl.H_2O$: C, 65.69; H, 8.93; N, 3.65. Found: C, 65.38; H, 9.21; N, 3.85.

The mixture of the hydrochlorides above obtained is subjected to the treatment with sodium hydroxide to afford the mixture of the corresponding free 12-aminosteroids.

(d) 12α-amino-4-pregnene-3,20-dione and 12β-amino-4-pregnene-3,20-dione: The mixture of 12α-amino-4-pregnene-3,20-dione and 12β-amino-4-pregnene-3,20-dione is treated as in Example 3(c) for the separation of each isomer through the tartrate, and additionally purified as the hydrochloride.

The analytical data of 12β-amino-4-pregnene-3,20-dione hydrochloride is as follows: M.P., 226 to 227° C. (decomp.).

UV $\lambda_{max.}^{ethanol}$ 239 m$\mu$ ($\epsilon$: 16,300); IR $\nu_{max.}^{Nujol}$ 3450, 1696, 1671, 1618, 1512, 1359, 860 cm.$^{-1}$ Anal. Calcd. for $C_{21}H_{31}O_2N.HCl.\frac{1}{2}H_2O$: C, 67.34; H, 8.87; N, 3.74; Cl, 9.46. Found: C, 67.58; H, 9.13; N, 3.93; Cl, 9.23.

The analytical data of 12α-amino-4-pregnene-3,20-dione hydrochloride has not yet been measured.

The starting material of this example, 3,3,20,20-bisethylenedioxy-12-hydroxyimino - 5 - pregnene, is prepared from 4-pregnene-12α-ol-3,20-dione 12-acetate [Just et al.: J. Org. Chem., vol. 23, page 12 (1958)] according to the process shown in the following scheme:

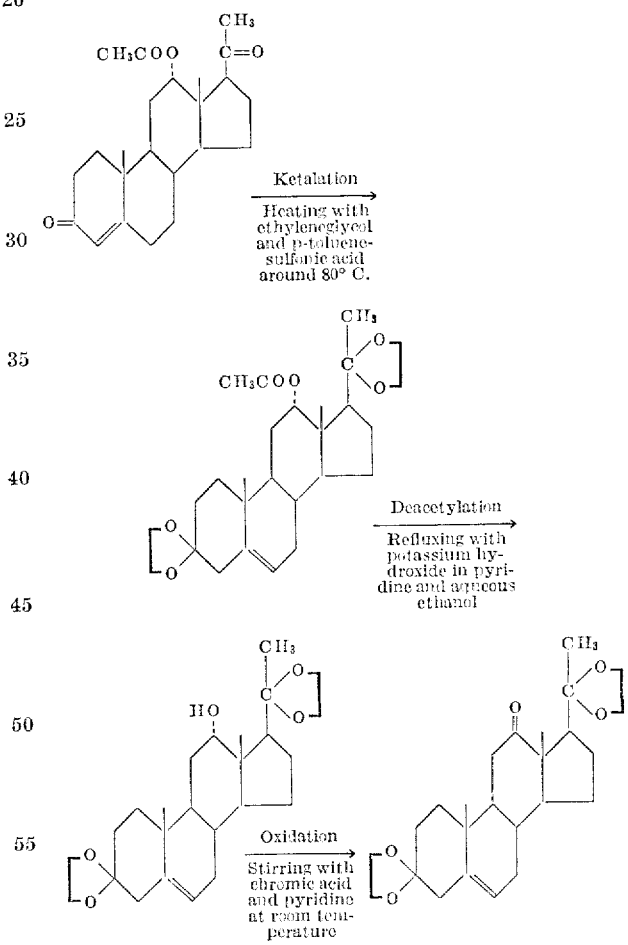

EXAMPLE 7

*Preparation of 12α-Amino-5β-Pregnane-3,20-Dione and 12β-Amino-5β-Pregnane-3,20-Dione*

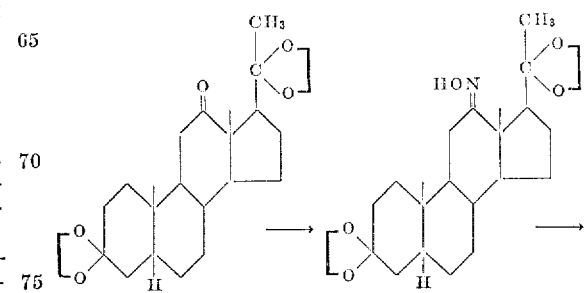

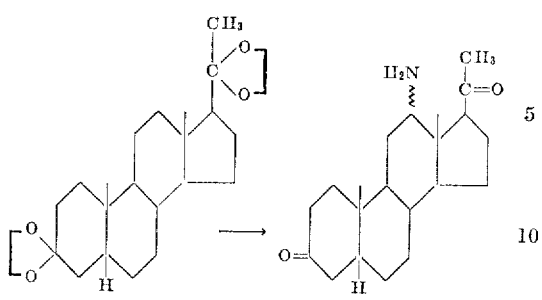

(a) 3,3,20,20-bisethylenedioxy - 12 - hydroxyimino-5β-pregnene: To a solution of 3,3,20,20-bisethylenedioxy-5β-pregnene-12-one (2.0 g.) in a mixture of ethanol (30 ml.) and anhydrous pyridine (30 ml.), there is added hydroxylamine prepared from hydroxylamine hydrochloride (2.0 g.), anhydrous sodium acetate (4 g.) and water (5 ml.), and the resultant mixture is heated for 30 minutes on a steam bath. After cooling, the precipitated sodium chloride is filtered. The filtrate is concentrated to afford crystals, which are recrystallized from acetone to give 3,3,20,20-bisethylenedioxy - 12 - hydroxyimino - 5β - pregnane (1.95 g.) as crystals melting at 250° C. (decomp.).

IR $\nu_{max}^{Nujol}$ 3368, 1651, 1191, 1159, 1098, 1061, 1000, 940, 923 cm.$^{-1}$ Anal. Calcd. for $C_{25}H_{39}O_5N.H_2O$: C, 66.49; H, 9.15; N, 3.10. Found: C, 66.51; H, 9.07; N, 3.33.

(b) A mixture of 3,3,20,20-bisethylendioxy-12α-amino-5β-pregnane and 3,3,20,20-bisethylendioxy-12β-amino-5β-pregnane: To a solution of 3,3,20,20-bisethylenedioxy-12-hydroxyimino-5β-pregnane (1.50 g.) in anhydrous n-propanol (100 ml.), there is added metallic sodium (10 g.) portionwise with stirring while refluxing. Then, the resultant mixture is refluxed for 2 hours. After cooling, water is added to the reaction mixture and concentrated under a reduced pressure. The residue is extracted with chloroform to afford a mixture of 3,3,20,20-bisethylenedioxy - 12α - amino - 5β-pregnane and 3,3,20,20-bisethylenedioxy-12β-amino-5β-pregnane (1.38 g.) as an oily substance.

(c) A mixture of 12α-amino-5β-pregnane-3,20-dione and 12β-amino-5β-pregnane-3,20-dione: The mixture of 3,3,20,20 - bisethylenedioxy-12α-amino-5β-pregnane-3,20-dione and 3,3,20,20-bisethylenedioxy-12β-amino-5β-pregnane-3,20-dione is treated as in Example 6(c) to afford a mixture of 12α - amino-5β-pregnane-3,20-dione and 12β-amino-5β-pregnane-3,20-dione.

The starting material of this example, 3,3,20,20-bisethylenedioxy-5β-pregnane-12-one, is prepared from 3,3,20,20-bisethylenedioxy-5β-pregnane-12α-ol [Engel et al.: J. Org. Chem., vol. 26, page 2869 (1961)] according to the process shown in the following scheme:

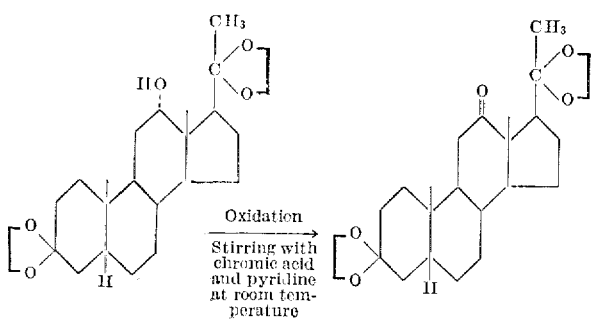

EXAMPLE 8

*Preparation of 12α-Amino-5α-Pregnane-3β,20β-Diol and 12β-Amino-5α-Pregnane-3β,20β-Diol*

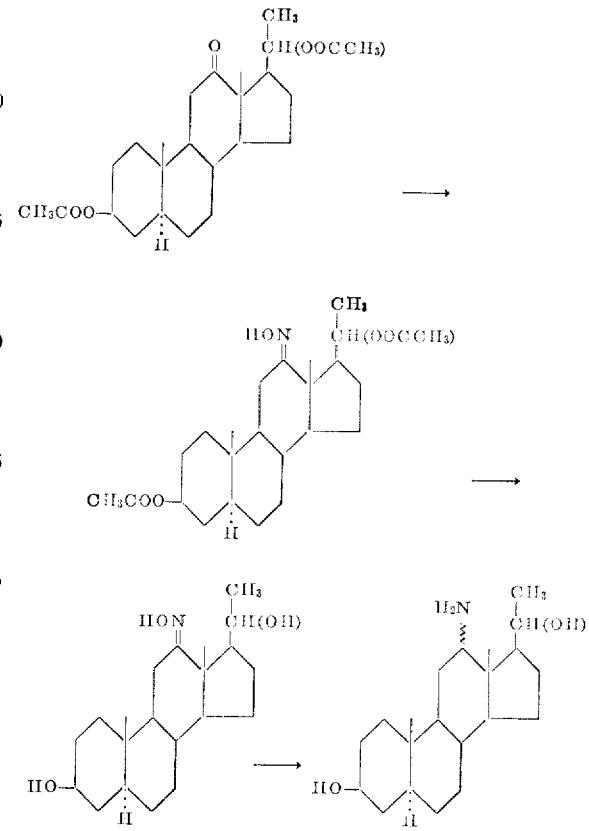

(a) 12-hydroxyimino-5α-pregnane-3β,20β-diol 3,20-diacetate: A solution of 5α-pregnane-3β,20β-diol-12-one 3,20-diacetate (1 g.), hydroxylamine hydrochloride (0.5 g.) and sodium acetate (1 g.) in 90% aqueous ethanol (20 ml.) is refluxed for 2 hours. After cooling, the reaction mixture is added to water, and the precipitated crystals are collected by filtration, washed with water and recrystallized from aqueous ethanol to afford 12-hydroxyimino-5α-pregnane-3β,20β-diol 3,20-diacetate as crystals melting at 186 to 187° C. at a yield of 90%.

IR $\nu_{max}^{Nujol}$ 3300, 1740, 1250, 1660 cm.$^{-1}$ (b) 12-hydroxyimino-5α-pregnane-3β,20β-diol: 12-hydroxyimino-5α-pregnane-3β,20β-diol 3,20-diacetate is hydrolyzed in a conventional manner to afford 12-hydroxyimino-5α-pregnane-3β,20β-diol.

(c) A mixture of 12α-amino-5α-pregnane-3β,20β-diol and 12β - amino - 5α - pregnane-3β,20β-diol: 12-hydroxyimino-5α-pregnane-3β,20β-diol is treated as in Example 3(b) to afford a mixture of 12α-amino-5α-pregnane-3β,20β-diol and 12β-amino-5α-pregnane-3β,20β-diol.

The starting material of this example, 5α-pregnane-3β,20β-diol-12-one 3,20-diacetate, is a known steroid [Kirk et al.: J. Chem. Soc., page 1046 (1957)].

It is to be understood that the invention is not to be limited to the exact details of operation or exact compounds shown and described, it being intended to limit the invention only by the scope of the appended claims.

What I claim is:
1. A member selected from the group consisting of compounds of the formulae

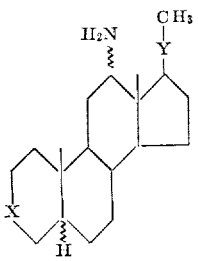

and

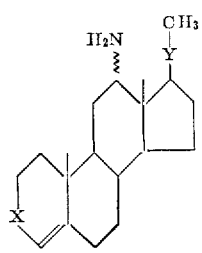

wherein X is a member selected from the group consisting of α - hydroxymethylene, β - hydrovymethylene and carbonyl; Y is a member selected from the group consisting of methylene, α-hydroxymethylene, β-hydroxymethylene and carbonyl, Y being carbonyl when X is carbonyl.

2. A compound selected from the group consisting of 12α - amino-5α-pregnane-3β,20β-diol, 12β-amino-5α-pregnane-3β,20β-diol and a mixture thereof.

3. A compound selected from the group consisting of 12α - amino-5α-pregnane-3β-ol, 12β-amino-5α-pregnane-3β-ol and a mixture thereof.

4. A compound selected from the group consisting of 12α-amino-4-pregnene-3,20-dione, 12β-amino-4-pregnene-3,20-dione and a mixture thereof.

5. A compound selected from the group consisting of 12α - amino-5β-pregnane-3,20-dione, 12β-amino-5β-pregnane-3,20-dione and a mixture thereof.

6. A member selected from the group consisting of compounds of the formulae

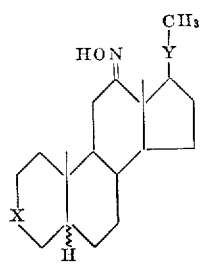

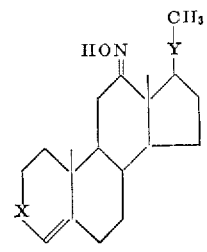

and

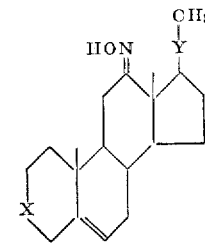

wherein X is a member selected from the group consisting of α-hydroxymethylene, β-hydroxymethylene, α-lower alkanoyloxymethylene, β-lower alkanoyloxymethylene, carbonyl and lower alkylenedioxymethylene; Y is a member selected from the group consisting of methylene, α-hydroxymethylene, β-hydroxymethylene, α-lower alkanoyloxymethylene, β-lower alkanoyloxymethylene, carbonyl and lower alkylenedioxymethylene, Y being carbonyl when X is carbonyl.

7. 12-hydroxyimino-5α-pregnane-3β,20β-diol.
8. 12-hydroxyimino-5α-pregnane-3β-ol.
9. 3,3,20,20 - bisethylenedioxy-12-hydroxyimino-5-pregnene.
10. 12-hydroxyimino-4-pregnene-3,20-dione.
11. 3,3,20,20 - bisethylenedioxy - 12 - hydroxyimino-5β-pregnane.
12. 12 - hydroxyimino - 5α-pregnane-3β,20β-diol 3,20-diacetate.

No references cited.

UNITED STATES PATENT OFFICE
CERTIFICATE OF CORRECTION

Patent No. 3,113,130            December 3, 1963

Hiroshi Mitsuhashi

It is hereby certified that error appears in the above numbered patent requiring correction and that the said Letters Patent should read as corrected below.

Column 1, line 59, for "inveniton" read -- invention --; column 4, line 21, for "postassium" read -- potassium --; column 5, line 44, for "nad" read -- and --; line 46, for "precipitate" read -- precipitates --; column 8, lines 53 to 64, the upper right-hand end of the first formula should appear as shown below instead of as in the patent:

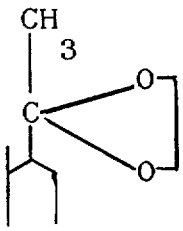

column 9, line 25, for "on" read -- an --; column 11, lines 1 to 12, the upper right-hand end of the first formula should appear as shown below instead of as in the patent:

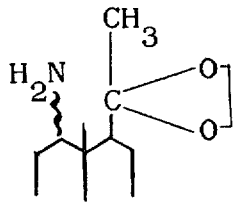

column 13, line 38, for "hydrovymethylene" read -- hydroxymethylene --.

Signed and sealed this 11th day of August 1964.

(SEAL)
Attest:

ERNEST W. SWIDER  
Attesting Officer

EDWARD J. BRENNER  
Commissioner of Patents